United States Patent
Hayashi et al.

(10) Patent No.: US 9,475,506 B2
(45) Date of Patent: Oct. 25, 2016

(54) ROLLING STOCK

(75) Inventors: Kentaro Hayashi, Nagoya (JP); Koji Nakao, Nagoya (JP)

(73) Assignee: Nippon Sharyo, Ltd., Nagoya-shi (JP)

( * ) Notice: Subject to any disclaimer, the term of this patent is extended or adjusted under 35 U.S.C. 154(b) by 121 days.

(21) Appl. No.: 14/377,411

(22) PCT Filed: Feb. 10, 2012

(86) PCT No.: PCT/JP2012/053046
§ 371 (c)(1),
(2), (4) Date: Aug. 7, 2014

(87) PCT Pub. No.: WO2013/118284
PCT Pub. Date: Aug. 15, 2013

(65) Prior Publication Data
US 2015/0020709 A1    Jan. 22, 2015

(51) Int. Cl.
*B61F 1/12* (2006.01)
*B61F 1/08* (2006.01)
*B61F 1/02* (2006.01)

(52) U.S. Cl.
CPC . *B61F 1/12* (2013.01); *B61F 1/02* (2013.01); *B61F 1/08* (2013.01)

(58) Field of Classification Search
CPC ............. B61F 1/00; B61F 1/02; B61F 1/04; B61F 1/06; B61F 1/08
USPC ................. 105/396, 413–416, 418, 420
See application file for complete search history.

(56) References Cited

U.S. PATENT DOCUMENTS 4,348,964 A * 9/1982 Randolph ................ B61F 1/08
105/420
2013/0104770 A1    5/2013 Nakao et al.

FOREIGN PATENT DOCUMENTS

| JP | 61-045278 | | 3/1986 |
| JP | 62-139753 | A | 6/1987 |
| JP | 05-058288 | A | 3/1993 |
| JP | 2001-260881 | A | 9/2001 |
| WO | WO-2011/142208 | A1 | 11/2011 |

OTHER PUBLICATIONS

International Search Report dated Apr. 24, 2012, issued for PCT/JP2012/053046.

* cited by examiner

Primary Examiner — Robert McCarry, Jr.
(74) Attorney, Agent, or Firm — Locke Lord LLP

(57) ABSTRACT

Provided is rolling stock in which a center beam is formed of an upper plate part, a lower plate part, and a pair of side plate parts located on opposite sides of the upper plate part and the lower plate part into a rectangular tube cross-sectional shape. Each of the upper plate part and the lower plate part is formed by placing a plurality of plate members on each other, at least an outermost one of the plate members is formed in a flat plate shape, and a ridge portion projecting to a tube inner side is formed in a center portion, in the width direction, of the plate member located on an inner side such that the ridge portion is continuous in a longitudinal direction of the center beam, and which has an underframe capable of preventing the upper plate part and the lower plate part from buckling.

8 Claims, 6 Drawing Sheets

FIG.6
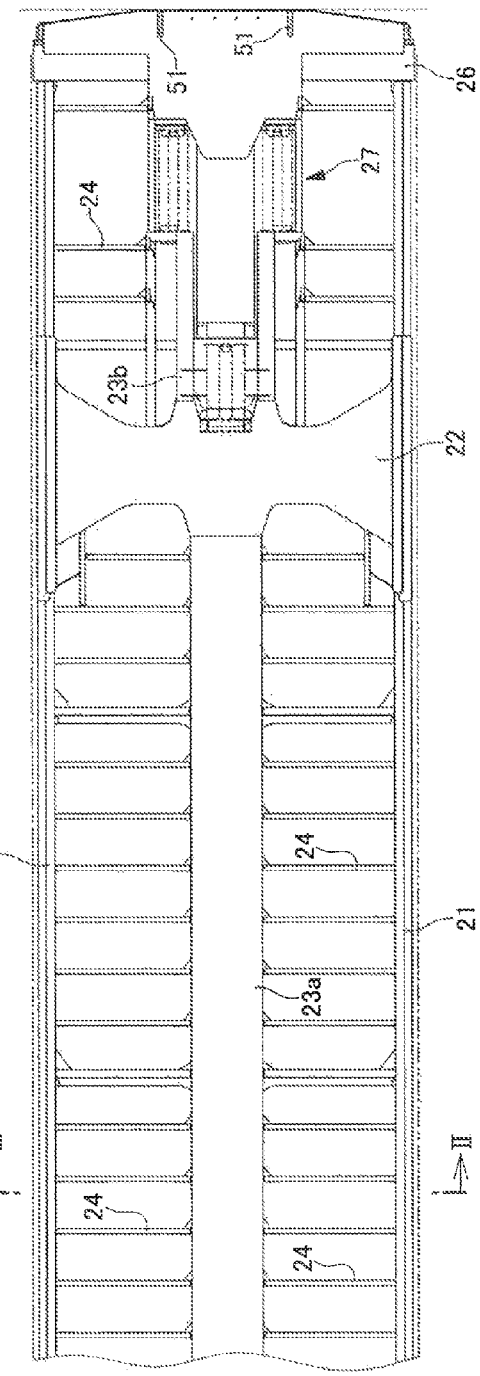
(a)
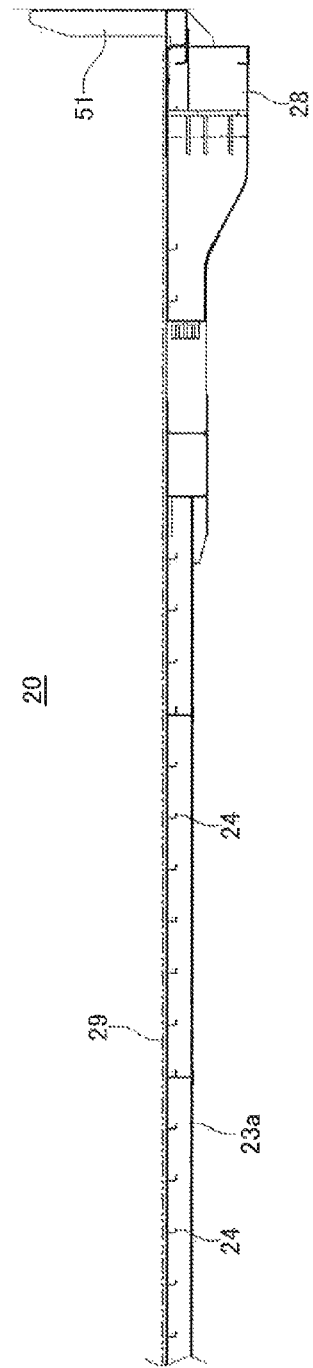
(b)

ROLLING STOCK

TECHNICAL FIELD

The present invention relates to a rolling stock, and relates specifically to a construction of a center beam in an underframe of a rolling stock.

BACKGROUND ART

A car body of a rolling stock is formed by joining side structures and end structures (including a cab end structure) to four side portions of an underframe, then joining a roof structure to upper portions of the side structures and the end structures, and attaching outside plates, floor plates, interior decorative members, doors, windows, and the like to the structures. Meanwhile, couplers for coupling rolling stocks in a front-rear direction are provided in center lower portions of the opposite end portions of the underframe, and are attached with strength sufficient to withstand pre-set tensile load and compressive load. Moreover, a coupler is known which is formed to slide rearward when an excess load, which exceeds a pre-set load, acts on the coupler by collision (see for example Patent Document 1).

PRIOR ART DOCUMENT

Patent Document

Patent Document 1: Japanese Patent Application Publication No. 2001-260881

SUMMARY OF THE INVENTION

Problem to be Solved by the Invention

In a case where the coupler is provided in a lower portion of the underframe, bending moment in a direction causing the center portion of the center beam to be deflected upward or downward acts on the underframe, in particular on a center beam to which the coupler is attached, due to tensile load and compressive load acting on the coupler. Furthermore, when a large external force such as collision applies to the coupler, upward bending moment and compressive load act on the center beam. Accordingly, an excessively large compressive load acts on the lower portion of the center beam, which is located inside the bending, leading to a possibility that the center beam is buckled. These bending moment and compressive load can be dealt with by increasing the height dimension or the thickness of the center beam. However, in the case of a rolling stock having many pieces of large underfloor equipment, such as a diesel railcar, since it is necessary to secure an installation space for such underfloor equipment, the size of the center beam cannot be increased. In addition, if the thickness of the center beam is increased, there arises a problem that the weight of the car body is increased.

SUMMARY OF THE INVENTION

Problem to be Solved by the Invention

In view of this, an object of the present invention is to provide a rolling stock including a center beam of a construction having a sufficient strength against compressive load and bending moment while achieving size and weight reduction.

Means for Solving the Problem

To achieve the above-described object, a rolling stock of the present invention is a rolling stock including a coupler in a center lower portion of each of a front end and a rear end of a car body formed by joining an underframe, side structures, end structures, and a roof structure, in which a center beam provided in a front-rear direction at a center of the underframe in a width direction is formed of an upper plate part, a lower plate part, and a pair of side plate parts located on opposite sides of the upper plate part and the lower plate part into a rectangular tube cross-sectional shape, each of the upper plate part and the lower plate part is formed by placing a plurality of plate members on each other, at least an outermost one of the plate members is formed in a flat plate shape, and a ridge portion projecting to a tube inner side is formed in a center portion, in the width direction, of the plate member located on an inner side such that the ridge portion is continuous in a longitudinal direction of the center beam.

Moreover, in the rolling stock of the present invention, in the center beam, the pair of side plate parts are formed respectively of webs of a pair of channel members each having an opening directed outward, the upper plate part is formed of: a single upper outer plate member which has opposite side portions in the width direction being joined respectively to upper flanges of the pair of channel members; and a single upper inner plate member which is placed on a tube inner side of the upper outer plate member, the lower plate part is formed of: a lower outer plate member which is formed by placing two plate members and which has opposite side portions in the width direction being joined respectively to lower flanges of the pair of channel members; and a single lower inner plate member placed on a tube inner side of the lower outer plate member, and the ridge portion is formed in center portions of the upper inner plate member and the lower inner plate member in the width direction.

In the rolling stock, a width dimension of the lower plate part is larger than a width dimension of the upper plate part, and a cross beam joint member is joined to an outer face of the web of each of the channel members and an upper face of the corresponding lower flange, the cross beam joint member being configured to be joined to a cross beam configured to couple the center beam and the corresponding one of the side beams on the opposite sides of the underframe, and a cross beam having a smaller height dimension than that of the center beam is joined to the cross beam joint member such that an upper face of the cross beam is made flush with an upper face of the center beam.

Effect of the Invention

According to the rolling stock of the present invention, since the ridge portions are formed in the plate members located on the tube inner sides of the upper plate part and the lower plate part, it is possible to prevent the upper plate part and the lower plate part from being buckled by compressive load and bending moment applied from the coupler thereto, and to thus enhance the strength of the center beam. Moreover, since the outer most portions of the upper plate part and the lower plate part are formed in flat-plate shapes, it is easy to attach floor members and the like, which are attached to the upper side of the underframe, and also to attach underfloor equipment, which is attached to the lower side of the underframe.

In addition, it is possible to reduce stress of the lower plate part, on which larger compressive load and bending moment than those acting on the upper plate part, and to thus further enhance the strength of the center beam, by forming the side plate part of the channel member and forming the center beam by forming the lower outer plate member of the lower plate part by placing two plate members, and further by making the width dimension of the lower plate part larger than the width dimension of the upper plate part. Furthermore, it is possible to enhance the joint strength of the cross beams by joining the cross beams with the cross beam joint members joined to the web of the channel members and the lower flanges. In addition, it is possible to secure the space for attaching underfloor equipment by joining the cross beam having a smaller height dimension than that of the center beam such that the upper surface of the cross beam is made flush, and to thus easily attach floor members and the like to the upper face of the underframe.

BRIEF DESCRIPTION OF THE DRAWINGS

FIG. 6 is a view showing an example of an underframe.

MODES FOR CARRYING OUT THE INVENTION

Figure 1:
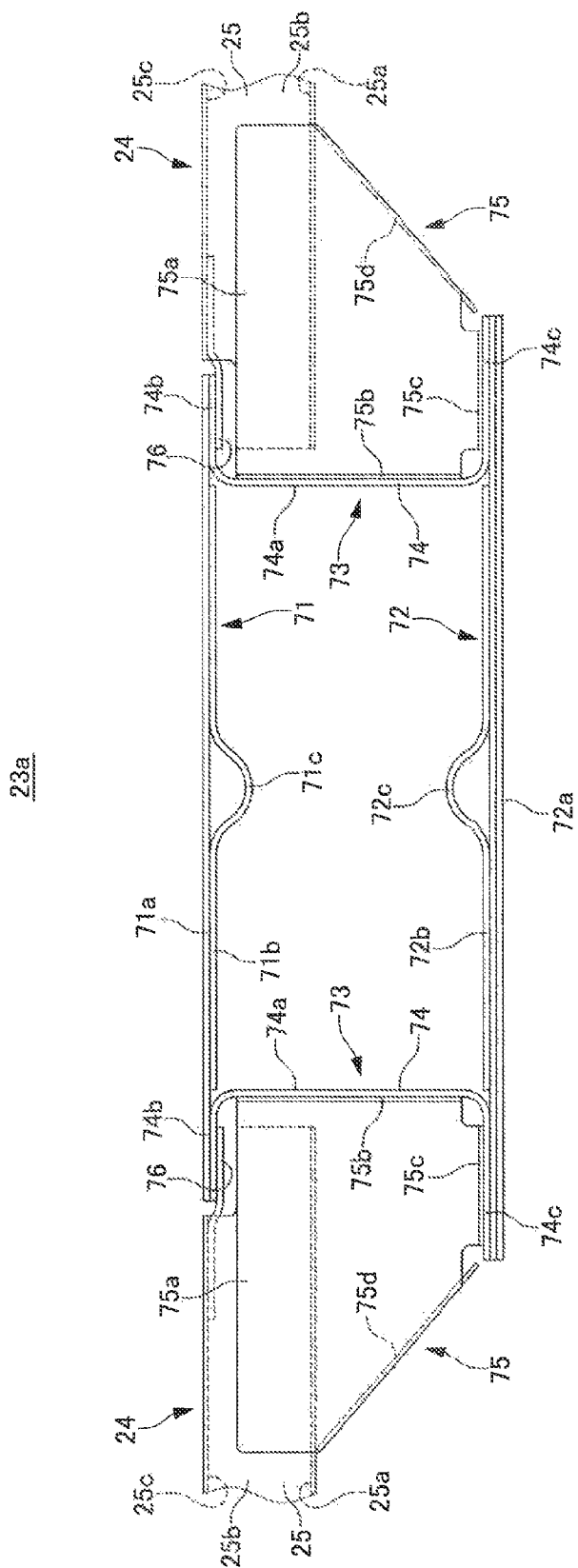
FIG. 1 is a main-part cross-sectional view showing a first embodiment of a rolling stock of the present invention.
Figure 2:
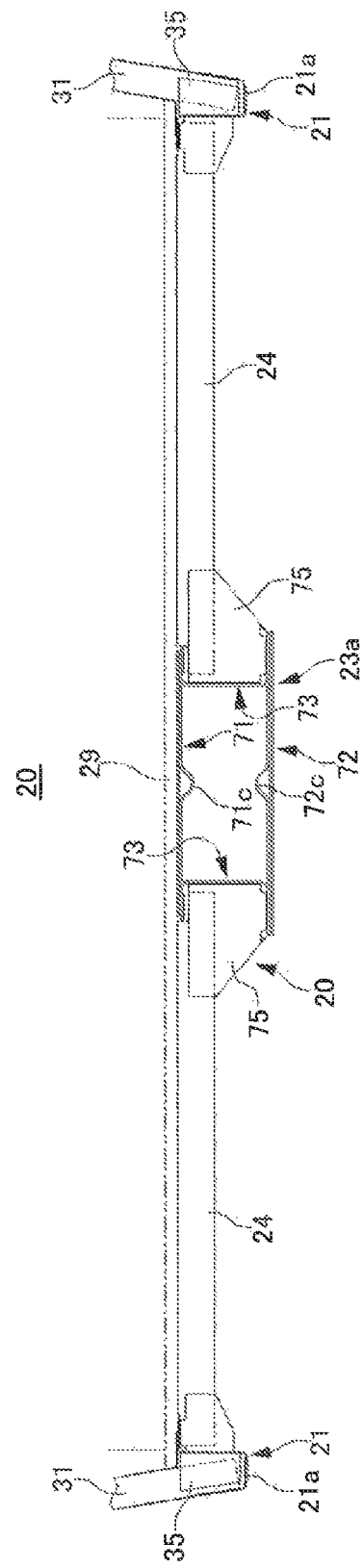
FIG. 2 is a cross-sectional view taken along the line II-II in FIG. 6.
Figure 3:
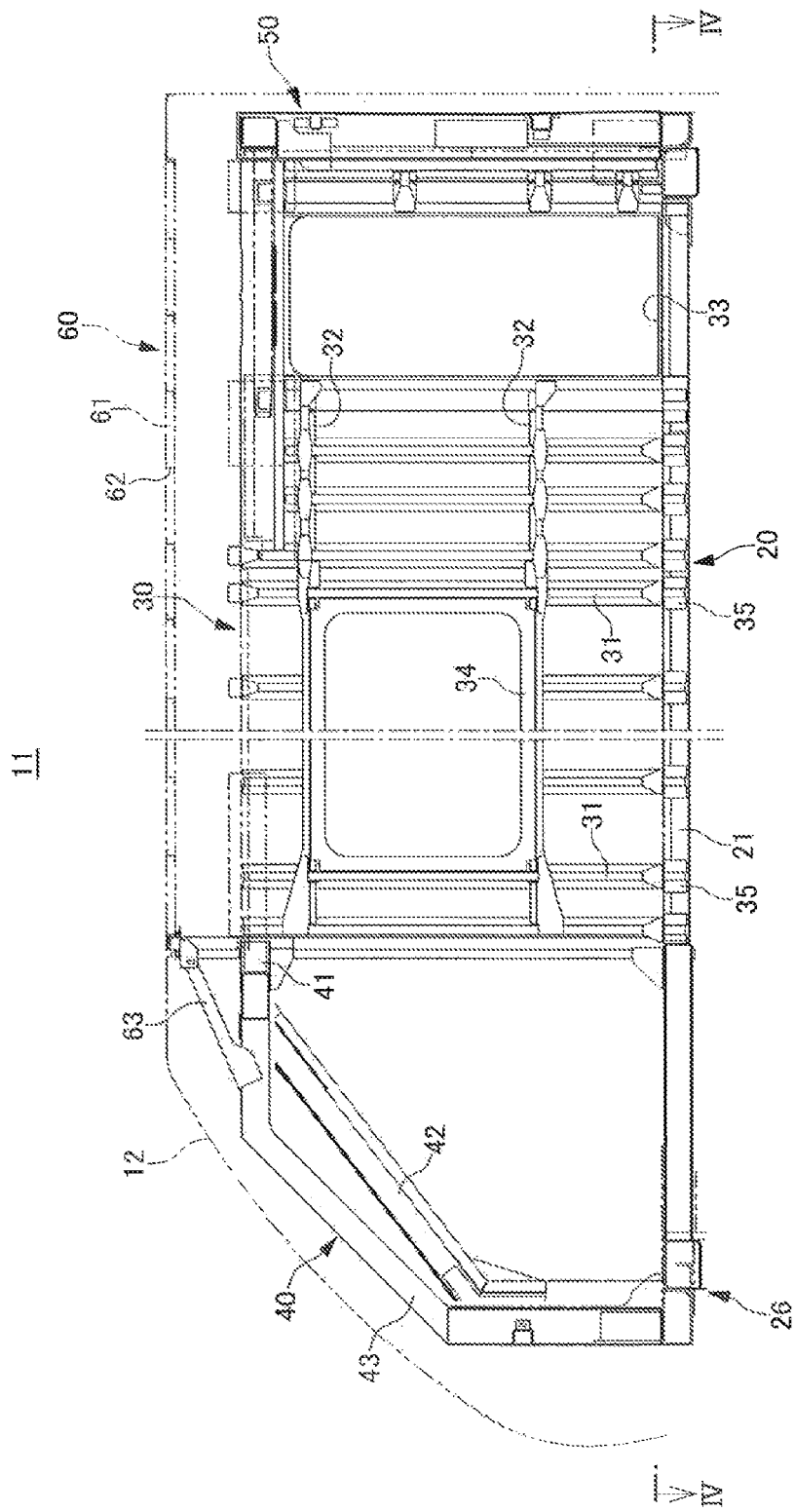
FIG. 3 is a side view showing an example of a rolling stock structure.
Figure 4:
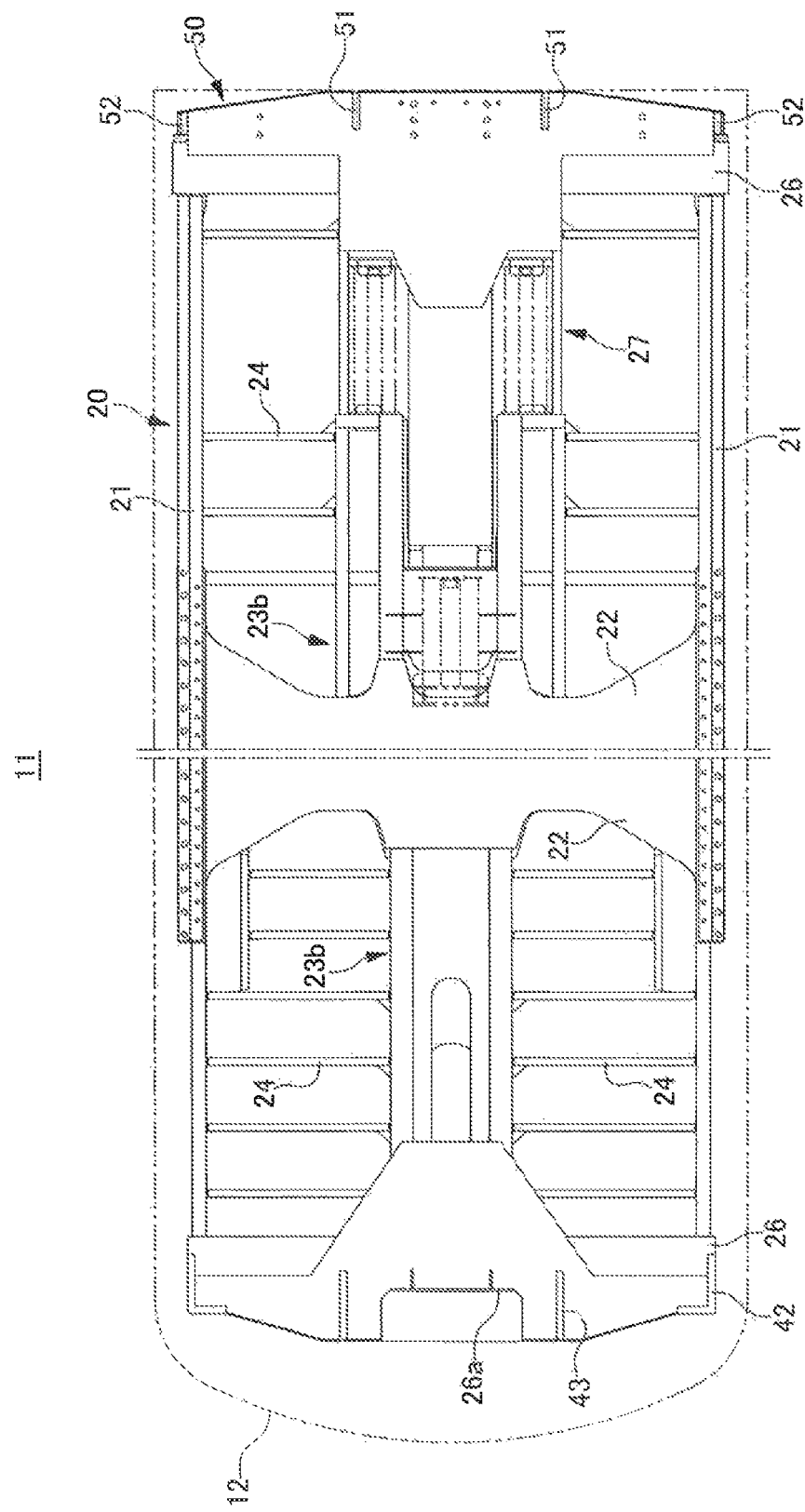
FIG. 4 is a cross-sectional view taken along the line IV-IV in FIG. 3.

A rolling stock shown in the embodiment is a first rolling stock 10 having a streamlined shape in a front end of a car body. A rolling stock structure 11 forming the first rolling stock 10 includes: an underframe 20; a pair of left and right side structures 30 provided on the opposite sides of the underframe 20; a cab end structure 40 and an end structure 50 provided respectively on the opposite ends of the underframe 20 and the side structures 30; and a roof structure 60 provided to cover upper portions of the side structures 30, the cab end structure 40, and the end structure 50. The cab end structure 40 is formed in a streamlined shape in which an upper half portion is inclined rearward and the opposite side portions are inclined rearward.

The underframe 20 includes: a pair of left and right side beams 21 disposed in a rail direction (a car-body front-rear direction); a pair of front and rear bolster beams 22 disposed in a railroad-tie direction (a car-body width direction) near the front and rear end portions; a center-portion center beam 23a and end-portion center beams 23b provided in a center portion of the underframe 20 in parallel with the side beams 21; a plurality of cross beams 24 coupling the side beams 21 and the center beams 23a, 23b in the railroad-tie direction; end beams 26 provided respectively on the leading ends of the end-portion center beams 23b provided on the car-body opposite end sides of the bolster beams 22. An impact absorbing member attachment recess portion 26a, which is open frontward for attaching an impact absorbing member, is formed in a front portion of the end beam 26 disposed on the cab end structure side. An impact absorbing part 27 is mounted in the end-portion center beam 23b on the end structure 50 side.

The side structures 30 include: a plurality of side posts 31 extending in a vertical direction; a plurality of frame members 32 extending in the car-body front-rear direction; door frame parts 33 forming gate opening portions; and window frame parts 34 forming side-window opening portions. Lower end portions of the side posts 31 are joined, to outer faces of the corresponding side beams 21 on lower projecting pieces 21a projecting sideward from lower ends of the side beams 21 by means of joint members 35.

The cab end structure 40 is provided with a driver's cabin in a center portion in the car-body width direction. An upper reinforcement beam 41 extending in the railroad-tie direction is provided at a joint portion between an upper end portion of a rear side of the cab end structure 40 and upper end portions of head sides of the side structures 30. A pair of left and right corner posts 42 are provided in a front end portion of the cab end structure 40 in such a manner as to extend between the opposite end portions of the end beam 26 in the width direction and the opposite end portions of the upper reinforcement beam 41 in the width direction. A pair of left and right end posts 43 are provided at positions on the opposite sides of the driver's cabin, and on the inner sides of the corner posts 42, in such a manner as to extend between the end beam 26 and the upper reinforcement beam 41. On the other hand, the end structure 50 on the rear coupling side is formed in a flat-plate shape, and has a gangway opening portion provided in a center portion in the width direction. End reinforcement posts 51 and corner reinforcement posts 52 are provided upright from the end beams 26 on the opposite side portions of the gangway opening portion.

The roof structure 60 is formed of: long girders 61 disposed in the rail direction; a plurality of rafters 62 extending in the railroad-tie direction, which are joined orthogonally to the long girders 61; and a roof board joined to outer face sides of the rafters 62. The long girders 61 are joined to upper end portions of the side structures 30, and the rafters 62 on the front and rear ends are joined respectively to an upper end portion of the cab end structure 40 and an upper end portion of the end structure 50. In addition, a front end of the roof structure 60 and upper portions of the end posts 43 are coupled by coupling members 63.

Figure 5:
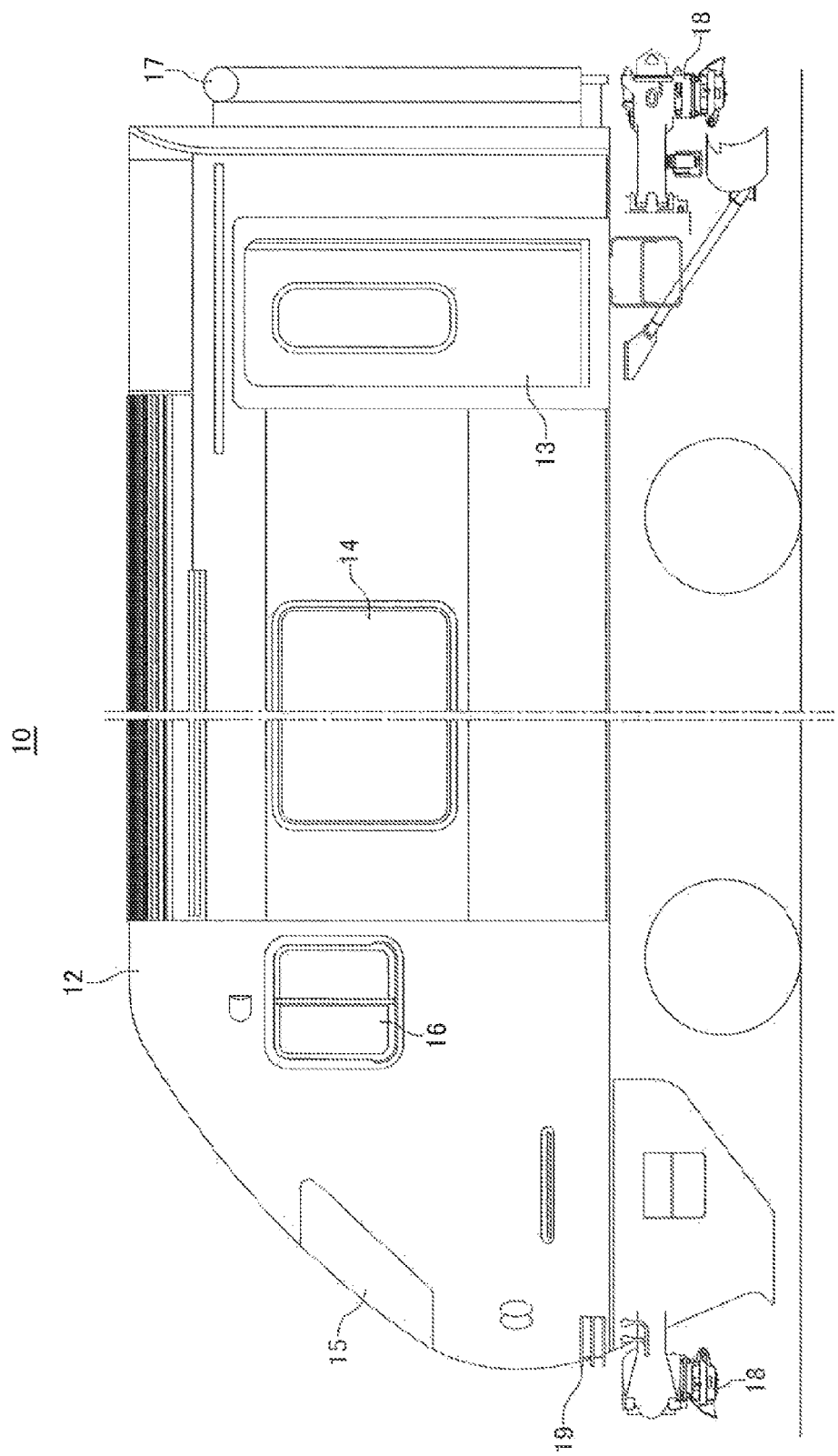
FIG. 5 is a side view showing an example of a rolling stock.

As shown in FIG. 5, outside plates 12 having shapes corresponding to the corresponding structures are attached to outer sides of the structures, and rigs and interior decorations, including various instruments and seats, are provided inside and outside the structures. In addition, a passenger door 13 is provided in the door frame part 33 and a side window 14 is provided in the window frame part 34. A front window 15 is provided in a middle portion of the front face of the cab end structure 40 in the up-down direction, and a crew window 16 is provided in a side face of the cab end structure 40. A coupling hood 17 is provided around the gangway opening portion of the end structure 50. Moreover, couplers 18 are provided respectively on lower portions of the opposite ends of the car body, and an anti-climber 19 is provided in a lower portion of the front face. By mounting required components such as the outside plates 12 inside and outside the rolling stock structure 11 as described above, the streamlined first rolling stock 10 with a rounded head portion having the driver's cabin at the center in the width direction is formed.

A coupler support frame 28 for attaching the coupler 18 is provided in a center lower portion of the end beam 26 on the front and rear ends of the end-portion center beam 23b in the underframe 20. The coupler support frame 28 holds the coupler with strength to withstand pre-set tensile load and compressive load, and is formed such that when an excess load exceeding the load set in advance is applied to the coupler 18, the coupler 18 is moved rearward of the end beam 26.

Moreover, as shown in detail in FIG. 1, the center-portion center beam 23a in the center portion of the car body, which is provided between the front and rear bolster beams 22 in the underframe 20, is formed of an upper plate part 71, a lower plate part 72, and a pair of side plate parts 73, 73 located on the opposite sides of the upper plate part 71 and the lower plate part 72 into a rectangular tube cross-sectional shape. Each of the side plate parts 73 is formed with a web 74a of a channel member 74 having an opening directed outward, and the upper plate part 71 is joined to an upper flange 74b of the channel member 74 and the lower plate part 72 is joined to a lower flange 74c, which is formed wider than the upper flange 74b.

The upper plate part 71 is formed of a single upper outer plate member 71a, which is located on the tube outer side (the tube upper side), and a single upper inner plate member 71b, which is located on the tube inner side. The upper outer plate member 71a is formed from a strip-shaped flat plate long in the car-body front-rear direction. The opposite side portions of the upper outer plate member 71a are joined in a state of being placed on upper faces of the upper flanges 74b of the channel members 74, in addition, the upper inner plate member 71b has a ridge portion 71c projecting to the tube inner side in a center portion in the width direction, and the ridge portion 71c is formed to be continuous in the longitudinal direction of the center-portion center beam 23a while being accommodated between the webs 74a of the opposite channel members 74. The upper inner plate member 71b is joined to the upper outer plate member 71a with upper faces of flat plate portions on the opposite sides of the ridge portion 71c being placed on the lower face of the upper outer plate member 71a.

The lower plate part 72 is formed of a lower outer plate member 72a, which is formed by placing two strip-shaped flat plates long in the car-body front-rear direction on each other and is located on the tube outer side (the tube lower side), and a single lower inner plate member 72b, which is located on the tube inner side. The lower outer plate member 72a is formed to have a larger width dimension than the width dimension of the upper outer plate member 71a. The opposite side portions of the lower outer plate member 72a are joined in a state of being placed on lower faces of the lower flanges 74c of the channel members 74. The lower inner plate member 72b has a ridge portion 72c projecting to the tube inner side in a center portion in the width direction, and the ridge portion 72c is formed to be continuous in the longitudinal direction of the center-portion center beam 23a while being accommodated between the webs 74a of the opposite channel members 74. The lower inner plate member 72b is joined to the lower outer plate member 72a with lower faces of flat plate portions on the opposite sides of the ridge portion 72c being placed on the upper face of the lower outer plate member 72a.

As described above, providing the ridge portion 71c and the ridge portion 72c respectively to the upper plate part 71 and the lower plate part 72 of the center-portion center beam 23a makes it possible to enhance the strength against a bending moment in a direction causing the center portion of the center-portion center beam 23a to be deflected upward or downward. Accordingly, the center-portion center beam 23a is not largely deflected by the bending moment that occurs by tensile load and compressive load, acting on the coupler 18 located downward of the center beam 23b. The rigidity of the car body can thus be enhanced. In addition, since the center-portion center beam 23a can be formed by combining plate members and channel members, reductions in size, weight and manufacture costs of the center-portion center beam 23a can also be achieved by appropriately setting the thickness and the like.

Moreover, even if such an excess external force that the coupler 18 is moved rearward by collision acts on the center-portion center beam 23a, the center-portion center beam 23a is prevented from buckling due to compressive load and bending moment, making it possible to protect the passenger compartment located in the center of the car body. Furthermore, as shown in the embodiment, stress generated in the plate members 72a, 72b of the lower plate part 72 can be reduced by using two plate members to form the lower outer plate member 72a of the lower plate part 72 of the center-portion center beam 23a, on which large compressive load and bending moment acts due to an external force at the time of collision, and by making the width dimension of the lower plate part 72 larger than the width dimension of the upper plate part 71. In this way, the strength of the center-portion center beam 23a can be further enhanced, and reductions in weight and manufacture costs of the center-portion center beam 23a can be achieved as compared to the case where the entire center beam is thickened or formed of two plate members.

In addition, the cross beams 24, each formed of a channel member 25 having an opening directed in the front-rear direction, are joined respectively to the outer side portions (on the side beam side) of the channel members 74 via cross beam joint members 75. Each of the cross beam joint members 75 has: a main body portion 75a, which is in the shape of a distorted pentagon directed in the car-body width direction; a first joint piece 75b, which is bent from an end of the main body portion 75a on the inside of the car body in such a manner as to be placed on the outer face of the web 74a of the channel member 74 and which extends in the vertical direction; a second joint piece 75c, which is bent from a lower end of the main body portion 75a in such a manner as to overlap the upper face of the lower flange 74c of the channel member 74 and which extends in the horizontal direction; and an inclined support piece 75d, which is inclined upward from an outer end portion of the second joint piece 75c and is bent in such a manner as to support the lower face of the cross beams 24. The cross beam joint member 75 is fixed to the side face portion of the center-portion center beam 23a by joining the first joint piece 75b to the outer face of the web 74a and joining the second joint piece 75c to the upper face of the lower flange 74c.

The cross beams 24 is fixed to the cross beam joint member 75 by joining the outer face of the web 25b to the main body portion 75a in a state where the lower face of a lower flange 25a of the channel member 25, which is formed to have a smaller height dimension than that of the channel member 74 of the center-portion center beam 23a, is placed on the upper end of the support piece 75d. Moreover, the inner end of the upper portion of the cross beam 24 is fixed to the side face of the upper portion of the center-portion center beam. 23a by means of a coupling plate 76, which is joined to the lower face of the upper flange 25c and the lower face of the upper flange 74b of the channel member 74, in a state where the inner end portion of the upper flange 25c and the upper end portion of the web 25b are cut out, and the inner end of the cross beam 24 is inserted below the upper flange 74b of the channel member 74 such that the upper face of the cross beam 24 is made flush with the upper face of the center-portion center beam 23a.

As described above, since the inner end portion of the cross beam 24 is joined, by means of the cross beam joint, member 75 joined to the web 74a and the lower flange 74c of the channel member 74 of the center-portion center beam 23a, it is possible to enhance the joint strength of the cross beam 24 to the center-portion center beam 23a. Furthermore, since the cross beam 24, which has a smaller height dimension than that of the center-portion center beam 23a, is joined while being displaced upward such that the upper faces of the center-portion center beam 23a and the cross beam 24 are made flush with each other, it is possible to easily attach the floor member 29 and the like to the upper face of the underframe 20 and to secure a space sufficient for attaching underfloor equipment to the lower portion of the cross beams 24. As a result, easy attachment of underfloor equipment can be achieved also in a diesel railcar having many pieces of large-sized underfloor equipment.

Note that the rolling stock may have any shape, but is not limited to a first rolling stock, and may accordingly have any shape and configuration except the underframe. In addition, the shape and configuration of the underframe may also have any shape and configuration except the center beam. Moreover, any number of plate-shaped members may be used for the upper plate part and the lower plate part. When three plate-shaped members or more are used, the ridge portion may be formed in a plurality of the plate-shaped members on the tube inner side except the outermost one. Furthermore, the same construction may be employed for the end-portion center beam.

EXPLANATION OF THE REFERENCE NUMERALS 10 first rolling stock
11 rolling stock structure
12 outside plate
13 passenger door
14 side window
15 front window
16 crew window
17 coupling hood
18 coupler
19 anti-climber
20 underframe
21 side beams
21a lower projecting piece
22 bolster beam
23a a center-portion center beam
23b end-portion center beam
24 cross beam
25 channel member
25a lower flange
25b web
25c upper flange
26 end beam
26a impact absorbing member attachment recess portion
27 impact absorbing part
28 coupler support frame
29 floor member
30 side structures
31 side posts
32 frame member
33 door frame part
34 window frame part
35 joint member
40 cab end structure
41 upper reinforcement beam
42 corner post
43 end post
50 end structure
51 reinforcement post
60 roof structure
61 long girder
62 rafter
63 coupling member
71 upper plate part
71a upper outer plate member
71b upper inner plate member
71c ridge portion
72 lower plate part
72a lower outer plate member
72b lower inner plate member
72c ridge portion
73 side plate part
74 channel member
74a web
74b upper flange
74c lower flange
75 cross beam joint member
75a main body portion
75b first joint piece
75c second joint piece
75d inclined support piece
76 coupling plate

The invention claimed is:

1. A rolling stock, comprising:
a coupler at the center lower portion of each of a front end and a rear end of a car body, wherein the car body is formed by joining an underframe, side structures, end structures, and a roof structure;
a center beam provided in a front-rear direction at the center of the underframe in a width direction, wherein the center beam is formed of an upper plate part, a lower plate part, and a pair of side plate parts located on opposite sides of the upper plate part and the lower plate part into a rectangular tube cross-sectional shape,
each of the upper plate part and the lower plate part is formed by placing a plurality of plate members on each other,
at least an outermost one of the plate members is formed in a flat plate shape, and
a ridge portion projecting to a tube inner side is formed in a center portion, in the width direction, of the plate member located on an inner side such that the ridge portion is continuous in a longitudinal direction of the center beam.

2. The rolling stock according to claim 1, wherein
in the center beam,
the pair of side plate parts are formed respectively of webs of a pair of channel members each having an opening directed outward,
the upper plate part is formed of: a single upper outer plate member which has opposite side portions in the width direction being joined respectively to upper flanges of the pair of channel members; and a single upper inner plate member which is placed on a tube inner side of the upper outer plate member,
the lower plate part is formed of: a lower outer plate member which is formed by placing two plate members and which has opposite side portions in the width direction being joined respectively to lower flanges of the pair of channel members; and a single lower inner plate member placed on a tube inner side of the lower outer plate member, and the ridge portion is formed in center portions of the upper inner plate member and the lower inner plate member in the width direction.

3. The rolling stock according to claim 1, wherein a width dimension of the lower plate part is larger than a width dimension of the upper plate part.

4. The rolling stock according to claim 1, wherein
a cross beam joint member is joined to an outer face of the web of each of the channel members and an upper face of the corresponding lower flange, the cross beam joint member being configured to be joined to a cross beam configured to couple the center beam and the corresponding one of the side beams on the opposite sides of the underframe, and
a cross beam having a smaller height dimension than that of the center beam is joined to the cross beam joint member such that an upper face of the cross beam is made flush with an upper face of the center beam.

5. The rolling stock according to claim 2, wherein a width dimension of the lower plate part is larger than a width dimension of the upper plate part.

6. The rolling stock according to claim 2, wherein
a cross beam joint member is joined to an outer face of the web of each of the channel members and an upper face of the corresponding lower flange, the cross beam joint member being configured to be joined to a cross beam configured to couple the center beam and the corresponding one of the side beams on the opposite sides of the underframe, and
a cross beam having a smaller height dimension than that of the center beam is joined to the cross beam joint member such that an upper face of the cross beam is made flush with an upper face of the center beam.

7. The rolling stock according to claim 3, wherein
a cross beam joint member is joined to an outer face of the web of each of the channel members and an upper face of the corresponding lower flange, the cross beam joint member being configured to be joined to a cross beam configured to couple the center beam and the corresponding one of the side beams on the opposite sides of the underframe, and
a cross beam having a smaller height dimension than that of the center beam is joined to the cross beam joint member such that an upper face of the cross beam is made flush with an upper face of the center beam.

8. The rolling stock according to claim 5, wherein
a cross beam joint member is joined to an outer face of the web of each of the channel members and an upper face of the corresponding lower flange, the cross beam joint member being configured to be joined to a cross beam configured to couple the center beam and the corresponding one of the side beams on the opposite sides of the underframe, and
a cross beam having a smaller height dimension than that of the center beam is joined to the cross beam joint member such that an upper face of the cross beam is made flush with an upper face of the center beam.

* * * * *